US006900287B1

United States Patent
Tsuda et al.

(10) Patent No.: US 6,900,287 B1
(45) Date of Patent: May 31, 2005

(54) FLUCTIONAL FLUOROCOPOLYMER

(75) Inventors: Nobuhiko Tsuda, Settsu (JP); Takahiro Kitahara, Settsu (JP); Ryuji Iwakiri, deceased, late of Minoo (JP); by Miyuki Iwakiri, legal representative, Minoo (JP); Masaru Nagato, Settsu (JP); Ryoichi Fukagawa, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/674,249

(22) PCT Filed: Apr. 23, 1999

(86) PCT No.: PCT/JP99/02183

§ 371 (c)(1),
(2), (4) Date: Oct. 2, 2001

(87) PCT Pub. No.: WO99/57165

PCT Pub. Date: Nov. 11, 1999

(30) Foreign Application Priority Data

May 1, 1998 (JP) ............................................ 10/122384

(51) Int. Cl.$^7$ .......................... C08G 73/24; C08F 214/18
(52) U.S. Cl. ................. 528/451; 525/326.2; 525/328.9; 525/330.7
(58) Field of Search ....................... 528/451; 525/328.9, 525/330.7, 326.2

(56) References Cited

U.S. PATENT DOCUMENTS 3,445,434 A   5/1969   Stilmar

FOREIGN PATENT DOCUMENTS

| DE | 197 16 116 A1 | 1/1998 |
|----|---------------|--------|
| EP | 0 301 557 A1 | 2/1989 |
| EP | 0 481 478 A1 | 4/1992 |
| EP | 1 090 935 A1 | 4/2001 |
| JP | 63-83108 | 4/1988 |
| JP | 1-103670 | 4/1989 |
| JP | 2-34605 | 2/1990 |
| JP | 7-18002 | 1/1995 |
| JP | 8-41131 | 2/1996 |

OTHER PUBLICATIONS

Office Action for EP 99 91 7137 dated Oct. 15, 2002.

English translation of International Preliminary Examination Report for PCT/JP99/02183 dated Jul. 6, 2000.

Supplementary European Search Report for EP 99 91 7137 dated Oct. 18, 2001.

Database WPI, Section Ch, Week 198006, Derwent Publications, Ltd., London, Great Britain, XP 002179099 and JP 54 163985, Dec. 27, 1979.

*Primary Examiner*—Duc Truong
(74) *Attorney, Agent, or Firm*—Sughrue Mion, PLLC

(57) ABSTRACT

To provide a fluorine-containing copolymer having functional group which contains a hydrocarbon vinyl ether unit having functional group and a tetrafluoroethylene unit, has a fluorine content of not less than 10% by weight, is insoluble in tetrahydrofuran substantially, is excellent in adhesion to a substrate and makes it possible to carry out crosslinking easily.

10 Claims, No Drawings

FLUCTIONAL FLUOROCOPOLYMER

TECHNICAL FIELD

The present invention relates to a fluorine-containing copolymer having functional group. Further the present invention relates to a fluorine-containing copolymer which is excellent in chemical resistance, solvent resistance, water resistance, weather resistance, stain-proofing property, adhesion, and the like and is suitably used for a laminating film, co-extruded layered tube, etc.

BACKGROUND ART

Fluorine-containing copolymers comprising a vinyl monomer unit having hydrocarbon type functional group are described in JP-A-1-103670, JP-A-8-41131, etc. and it is known that they are useful as crosslinking coating resins when used in combination with a curing agent. Also a fluorine-containing copolymer prepared by copolymerizing perfluorobutenoic acid or a vinyl ether having a fluorine-based functional group is known as a fluorine-containing copolymer comprising a fluorine-containing vinyl monomer.

However a fluorine-containing resin copolymer which comprises a vinyl monomer unit having hydrocarbon type functional group and, is insoluble in tetrahydrofuran (THF) substantially has not been known. In case of a resin being soluble in THF, in order to realize solvent resistance, a combination use of a curing agent capable of forming a crosslinked structure has been essential. On the other hand, from the aspect of use as a molding material, when using the copolymer together with a curing agent, it was necessary to control molding and curing reaction in a very narrow temperature range, and thus heat-molding was very difficult substantially.

Also since a monomer having a fluorine-based functional group has a good reactivity with fluoroolefin such as tetrafluoroethylene (TFE), it can introduce a functional group into a melt-moldable resin insoluble in THF such as ethylene-tetrafluoroethylene copolymer (ETFE), tetrafluoroethylene/hexafluoropropylene copolymer (FEP) and tetrafluoroethylene/perfluoro(vinyl ether) copolymer (PFA). However a preparation process of the monomer ranges over multiple stages and is disadvantageous economically.

The present inventors have found that a hydrocarbon vinyl compound monomer having functional group, particularly a vinyl ether monomer having functional group reacts with a copolymer containing a specific amount of TFE unit and can give a resin insoluble in THF, and thus completed the present invention.

DISCLOSURE OF INVENTION

Namely the present invention relates to the fluorine-containing copolymer having functional group which comprises a hydrocarbon type vinyl unit having functional group and a TFE unit and is characterized in that the fluorine-containing copolymer has a fluorine content of not less than 10% by weight and is not dissolved in TFE substantially.

Examples of the preferred resin comprising the hydrocarbon vinyl compound unit having functional group and TFE unit are tetrafluoroethylene (TFE), hexafluoropropylene (HFP), ethylene (ET) and hydrocarbon type vinyl ether monomer having functional group and being copolymerizable therewith.

Examples of the preferred hydrocarbon vinyl compound having functional group are functional group-containing vinyl ethers, particularly monomers having hydroxyl or epoxy.

BEST MODE FOR CARRYING OUT THE INVENTION

The fluorine-containing copolymer of the present invention is explained below.

The fluorine-containing copolymer of the present invention is a copolymer having the following characteristics (1) to (4).

(1) Having TFE Unit

Since the copolymer has a TFE unit, a resin having excellent chemical resistance, solvent resistance, water resistance, weather resistance and stain-proofing property can be obtained. It is preferable that the TFE unit is contained in the copolymer in an amount of not less than 5% by mole, particularly 10 to 95% by mole.

(2) Having a Fluorine Content of Not Less than 10% by Weight

The fluorine content is derived from TFE and/or other fluorine-containing monomer. For the same reasons as in above (1), it is preferable that the fluorine content is not less than 10% by weight, preferably 20 to 75% by weight.

Examples of the other fluorine-containing monomer are, for instance, hexafluoropropylene, vinylidene fluoride, trifluoroethylene, monofluoroethylene, chlorotrifluoroethylene, and the like. Those fluorine-containing monomers are optional units, and a content thereof is not more than 30% by mole, usually 0 to 10% by mole.

(3) Being Insoluble in THF Substantially

Being insoluble in THF means that the copolymer is excellent in solvent resistance. In case of a known resin being soluble in THF, in order to realize solvent resistance, a combination use of a curing agent capable of forming a crosslinked structure has been essential. On the other hand, from the aspect of use as a molding material, when using the copolymer together with a curing agent, it was necessary to control molding and curing reaction in a very narrow temperature range, and heat-molding was very difficult substantially.

Being insoluble substantially encompasses the case of being soluble in THF in a concentration of less than 0.5% by weight. This is because when substantially measuring an intrinsic viscosity [η] of the resin in THF solution, a reliable intrinsic viscosity [η] cannot be measured unless the copolymer has a solubility of about 0.5% by weight or more.

(4) Having a Hydrocarbon Vinyl Compound Unit Having Functional Group, Preferably a Hydrocarbon Type Vinyl Ether Unit Having Functional Group The functional group has functions of not only giving a curing site to the fluorine-containing copolymer and providing a thermoset film by reacting with a curing agent but also enhancing adhesion to various substrates. Further by laminating or co-extruding together with a resin having a site being reactive with the functional group, interface adhesion is enhanced.

In the present invention, examples of the functional group are, for instance, functional groups represented by the formulae (i):

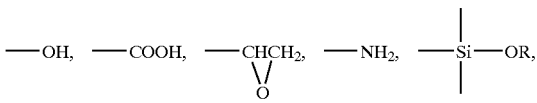

-continued $-\text{C}(=\text{O})\text{NH}_2$,   $-\text{SO}_3\text{H}$,   and   $-\text{OSO}_3\text{H}$, wherein R is an alkyl group having 1 to 3 carbon atoms.

Among the above-mentioned functional groups, preferred are those represented by the formulae (ii):

$-\text{OH}$,   $-\text{COOH}$,   and   $-\text{CH}-\text{CH}_2 \atop \diagdown\,\text{O}\,\diagup$ .

In the present invention, examples of the hydrocarbon type vinyl ether unit having functional group are, for instance, hydroxyl-containing vinyl ether, epoxy (glycidyl)-containing vinyl ether unit, and the like.

Examples of the monomer being capable of introducing such a functional group are hydroxyl-containing monomers such as hydroxybutyl vinyl ether (HBVE) and ally alcohol; epoxy (glycidyl)-containing monomers such as glycidyl vinyl ether (GVE), and the like.

Among them, from the viewpoint of reactivity with fluoroolefin, preferred are hydrocarbon vinyl ether monomers having functional group such as HBVE and GVE.

An amount of the functional group varies depending on reactivity of the functional group and kind of a curing agent from the viewpoint of curability and adhesion when using the curing agent. It is preferable that based on the whole fluorine-containing copolymer, an acid value is from 1 to 300 mgKOH/g, a hydroxyl value is from 1 to 200 mgKOH/g or an equivalent of epoxy is from 5 to 15,000 equivalents.

From the above-mentioned point of view, an amount of the unit giving the functional group may be selected in the range of from 0.1 to 30% by mole, particularly 1 to 20% by mole based on the fluorine-containing copolymer.

The fluorine-containing copolymer having functional group can be obtained by copolymerizing each of the above-mentioned monomers. The polymerization may be carried out by usual polymerization methods such as emulsion polymerization, suspension polymerization and solution polymerization. Also a monomer having functional group may be grafted on the copolymer.

Further it is preferable that the resin of the present invention has a melting point in the range of not more than 160° C. when measured with DSC. If the melting point exceeds 160° C., for example, when the resin is used for a powder coating and is baked, flowability is lowered and poor appearance of a coating film such as orange peel arises.

In the case of the application of the resin of the present invention to a film, it is preferable that MFR thereof at 230° C. at a load of 2.1 kg is in the range of 1 to 100 g/10 min.

Also in the case of use for lining of pipes and co-extrusion with an engineering plastic, it is preferable that MFR thereof at 160°C. at a load of 2.1 kg is in the range of 1 to 100 g/10 min.

Non-restricted examples of the fluorine-containing copolymer having functional group of the present invention are those having the following combinations of monomers and satisfying the above-mentioned requirements (1) to (4).

| (I) | ① Perfluoroolefin | not less than 5% by mole |
|---|---|---|
| | ② Other fluorine-containing monomer | 0 to 95% by mole |
| | ③ Other non-fluorine-containing monomer | 0 to 95% by mole |
| | ④ Functional group-containing hydrocarbon type vinyl ether monomer | not less than 0.1% by mole |
| (II) | ① At least one of TFE and HFP | not less than 5% by mole |
| | ② Other fluorine-containing monomer | 0 to 95% by mole |
| | ③ Non-fluorine-containing olefin | 0 to 95% by mole |
| | ④ Hydrocarbon type vinyl ether monomer containing functional group represented by the above-mentioned formula (i) | not less than 0.1% by mole |
| (III) | ① At least one of TFE and HFP | not less than 10% by mole |
| | ② Other fluorine-containing monomer | 0 to 20% by mole |
| | ③ Non-fluorine-containing olefin | 10 to 70% by mole |
| | ④ Hydrocarbon type vinyl ether monomer containing functional group represented by the above-mentioned formula (i) | not less than 0.1% by mole |
| (IV) | ① At least one of TFE and HFP | not less than 20% by mole |
| | ② Other fluorine-containing monomer | 0 to 5% by mole |
| | ③ Ethylene (ET) | 20 to 50% by mole |
| | ④ Hydrocarbon type vinyl ether monomer containing functional group represented by the above-mentioned formula (ii) | not less than 0.1% by mole |

Non-restricted examples of more concrete copolymer are as follows.

TFE/HFP/ET/HBVE copolymer (mole ratio: 25 to 40/10 to 20/35 to 48/0.1 to 10) and TFE/HFP/ET/GVE copolymer (mole ratio: 25 to 40/10 to 20/35 to 48/0.1 to 10).

In the present invention, the copolymer can be used together with a curing agent which is reactable with the functional group. A hardness and resistance against stress deformation which are obtained by crosslinking can be improved.

Examples of the usable curing agent are, for instance, epoxy or glycidyl compounds such as alicyclic epoxy resin, GMA acryl, aliphatic oxysilane, triglycidyl isocyanurate (TGIC), diglycidyl terephthalate, diglycidyl p-hydroxybenzoate, spiroglycol diglycidylether and hydantoin compounds; isophorone diisocyanate, tolylene diisocyanate, xylilene diisocyanate, 4,4'-diphenylmethane diisocyanate, hexamethylene diisocyanate, dimers thereof and blocked isocyanates obtained by blocking an isocyanate group of alcohol-modified polyisocyanate with a blocking agent (for example, ε-caprolactam, phenol, benzyl alcohol, methyl ethyl ketone oxime, etc.); polybasic acid curing agent such as β-hydroxyalkylamide; polycarboxylic acids, e.g. aliphatic dibasic acids such as fumaric acid, succinic acid, adipic acid, azelaic acid, sebacic acid and dodecanedioic acid (DDA) and acid anhydrides such as phthalic anhydride, trimellitic anhydride and pyromellitic anhydride; tetramethoxymethylglycoluryl, isocyanate-modified silane coupling agent, and other curing agents described in JP-B-6-104792, JP-A-7-188587 and JP-A-1-103670.

Among them, particularly from the viewpoint of compatibility with a crosslinkable functional group in the fluorine-containing copolymer having functional group, preferred combination are as follows.

(1) Functional group: Hydroxyl group
    Curing agent: Blocked isocyanate, polyurethodione
(2) Functional group: Carboxyl group
    Curing agent: Triglycidyl isocyanurate, β-hydroxyalkylamide, GMA acryl
(3) Functional group: Glycidyl group
    Curing agent: Aliphatic dibasic acid It is preferable that an amount of the curing agent is from 0.1 to 1.2 equivalents, especially 0.5 to 1.0 equivalent to an amount of functional group contained in the fluorine-containing copolymer.

In addition to the curing agent, a curing catalyst may be blended. Examples of the curing catalyst are, for instance, quaternary ammonium salts such as tetrabutylammonium chloride, tetrabutylammonium bromide and tetrabutylammonium iodide; quaternary phosphonium salts such as ethyltriphenylphosphonium acetate; phosphines such as triphenylphosphine; imidazoles such as 2-methylimidazole; organotin compounds such as dibutyltindilaurate and stannous octanoate; methyltolylsulfoneimide and stannous methanesulfonate, and the like. The curing catalyst may be blended in an amount of from about 0.1 part to about 3 parts to 100 parts of the fluorine-containing copolymer having functional group.

The fluorine-containing copolymer of the present invention is also excellent in adhesion to a substrate. Examples the substrate are, for instance, various metal plates such as stainless steel plate, aluminum plate, steel plate and galvanized steel plate, and in addition, heat resistant engineering plastics such as polycarbonate, polyphenylene oxide, polyethylene terephthalate, polyether sulfone, polyamideimide and polyether ether ketone.

The fluorine-containing copolymer of the present invention is used for various applications in the form of film. Non-restricted examples of the application are construction and building material, electric communication device, vehicles, road materials, water and gas service materials, metal products, domestic appliances, machines, tools, measuring instruments, medical instruments, utensils for maintenance, agricultural materials, ships, sports and leisure products, and the like.

Then the present invention is explained by means of examples, but is not limited to them.

EXAMPLE 1

A 4-liter pressure resistant reactor equipped with a stirrer was charged with 1,000 ml of deionized water and 1 g of potassium carbonate, and feeding of pressurized nitrogen and deairing were repeated to remove dissolved oxygen. Then the reactor was charged with 550 g of chlorofluoroethane (HCFC-141b), 7.2 g of hydroxybutyl vinyl ether (HBVE) and 650 g of hexafluoropropylene (HFP) successively. A pressure inside the reactor was increased up to 12 kgf/cm$^2$ at 35° C. with a monomer mixture of tetrafluoroethylene CIFE)/ethylene (ET) in a % by mole ratio of 82/18. Then the reactor was charged with 1 g of cyclohexane and 48 g of 25% flon 225 solution of isobutyryl peroxide, and a monomer mixture of tetrafluoroethylene (TFE)/ethylene (ET)/hexafluoropropylene (HFP) in a % by mole ratio of 37/43/20 was supplied continuously so that the inside pressure became constant at 12 kgf/cm$^2$. Every three hours after starting of the reaction, 8 g of 25% flon 225 solution of isobutyryl peroxide was added three times. After 12-hour reaction, the inside of the reactor was restored to normal temperature and normal pressure to terminate the reaction. After the obtained solid was washed and dehydrated, it was vacuum-dried at 80° C. to give 183 g of TFE/HFP/ET/HBVE copolymer (white powder). Polymer components, melting point (Tm), MFR and solubility in THF of the obtained fluorine-containing copolymer were measured by the methods mentioned below.

Melting point: A heat balance of 10 mg of VdF polymer was measured at a heat-up speed of 10° C./min in a temperature range of −25° C. to 200° C. by using Thermal Analysis System (available from Perkin Elmer Co., Ltd.), and a top peak was assumed to be a melting point.

MFR: Measurement was carried out under the conditions of 160° C., a load of 2.1 kg and 10 minutes and the conditions of 230° C., a load of 2.1 kg and 10 minutes.

Solubility in THF: 0.5 Gram of resin in the form of powder was put in 10 ml of THF at room temperature, and after allowed to stand for 72 hours, dissolving state was observed with naked eyes.

The results are shown in Table 1.

EXAMPLES 2 to 3

Polymerization was carried out in the same manner as in Example 1 except that monomer components, amount of cyclohexane and polymerization time were changed as shown in Table 1. The same measurements as in Example 1 were carried out with respect to the obtained fluorine-containing copolymer. The results are shown in Table 1.

TABLE 1

| Fluorine-containing copolymer having functional group | Example | | |
|---|---|---|---|
| | 1 | 2 | 3 |
| Monomer components | | | |
| TFE/ET (% by mole ratio) | 82/18 | 82/18 | 82/18 |
| HFP (g) | 794 | 794 | 794 |
| HBVE (g) | 21 | — | 21 |
| GVE (g) | — | 21 | — |
| Amount of cyclohexane (g) | 1 | 1 | 0.5 |
| Polymerization time (hr) | 12 | 12 | 7 |
| Obtained weight (g) | 183 | 198 | 167 |
| Polymer components (% by mole) | | | |
| TFE | 31 | 34 | 33 |
| HFP | 21 | 17 | 17 |
| ET | 48 | 44 | 45 |
| HBVE | 3 | — | 4 |
| GVE | — | 5 | — |
| Melting point (° C.) | 153 | 157 | 158 |
| MFR (g/10 min) at 230° C. | 77 | 65 | 96 |
| (g/10 min) at 160° C. | 14 | 8 | 39 |
| Solubility in THF | Insoluble | Insoluble | Insoluble |

INDUSTRIAL APPLICABILITY

The fluorine-containing copolymer having functional group of the present invention is excellent in adhesion to a substrate and co-extrusion property, and crosslinking can be easily carried out.

What is claimed is:

1. A fluorine-containing resinous copolymer having functional group, characterized in that the copolymer is crosslinkable, contains a hydrocarbon vinyl ether compound unit having functional group and tetrafluoroethylene unit, has a fluorine content of not less than 10% by weight and is insoluble in tetrahydrofuran substantially.

2. The fluorine-containing resinous copolymer having functional group of claim 1, wherein a melting point of the copolymer is not more than 160° C.

3. The fluorine-containing resinous copolymer having functional group of claim 1, wherein the copolymer contains tetrafluoroethylene unit, hexafluoropropylene unit and ethylene unit as essential components.

4. The fluorine-containing resinous copolymer having functional group of claim 1, wherein the hydrocarbon vinyl ether compound unit is hydroxybutyl vinyl ether unit or glycidyl vinyl ether unit.

5. A resin composition comprising a crosslinkable fluorine-containing resinous copolymer having functional group and a curing agent which is reactive with the functional group of the copolymer, wherein said copolymer contains a hydrocarbon vinyl ether compound unit having functional group and tetrafluoroethylene unit, has a fluorine content of not less than 10% by weight and is insoluble in tetrahydrofuran substantially.

6. The resin composition of claim 5, wherein a melting point of the copolymer is not more than 160° C.

7. The resin composition of claim 5, wherein the copolymer contains tetrafluoroethylene unit, hexafluoropropylene unit and ethylene unit as essential components.

8. The resin composition of claim 5, wherein the hydrocarbon vinyl ether compound unit is hydroxybutyl vinyl ether unit or glycidyl vinyl ether unit.

9. The resin composition of claim 5, wherein the composition is a resin composition for molding.

10. The resin composition of claim 5, wherein the composition is a resin composition for coating.

* * * * *